Oct. 2, 1928.                                          1,686,327
J. W. G. ILLAUER
SYSTEM FOR THE TELECONTROL OF OBJECTS
Filed June 26, 1924          3 Sheets-Sheet 1
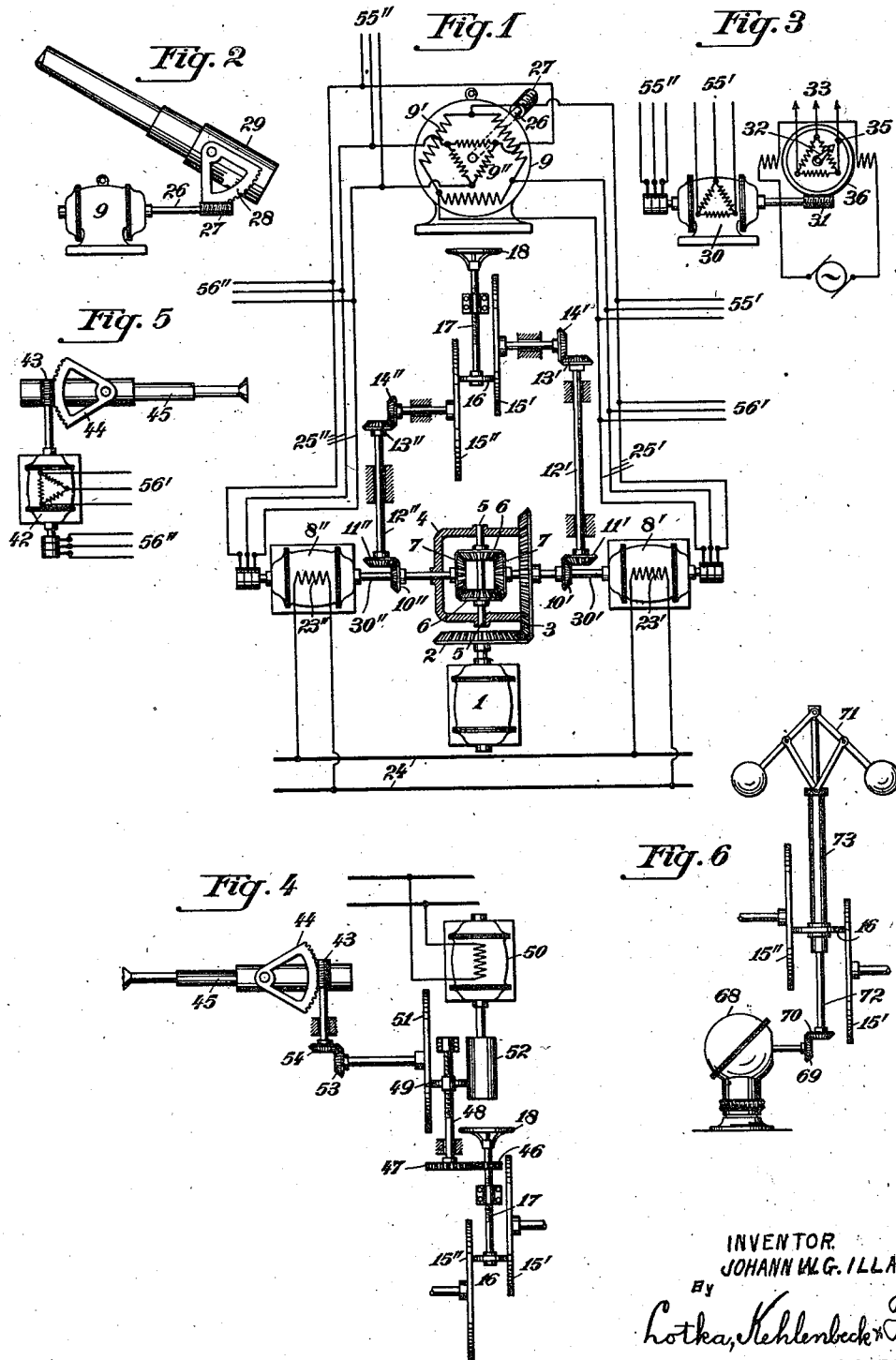
INVENTOR.
JOHANN W.G. ILLAUER,
By
Lotka, Kehlenbeck & Farley
ATTORNEYS.

Oct. 2, 1928.
J. W. G. ILLAUER
1,686,327
SYSTEM FOR THE TELECONTROL OF OBJECTS
Filed June 26, 1924   3 Sheets-Sheet 2
*Fig. 7*
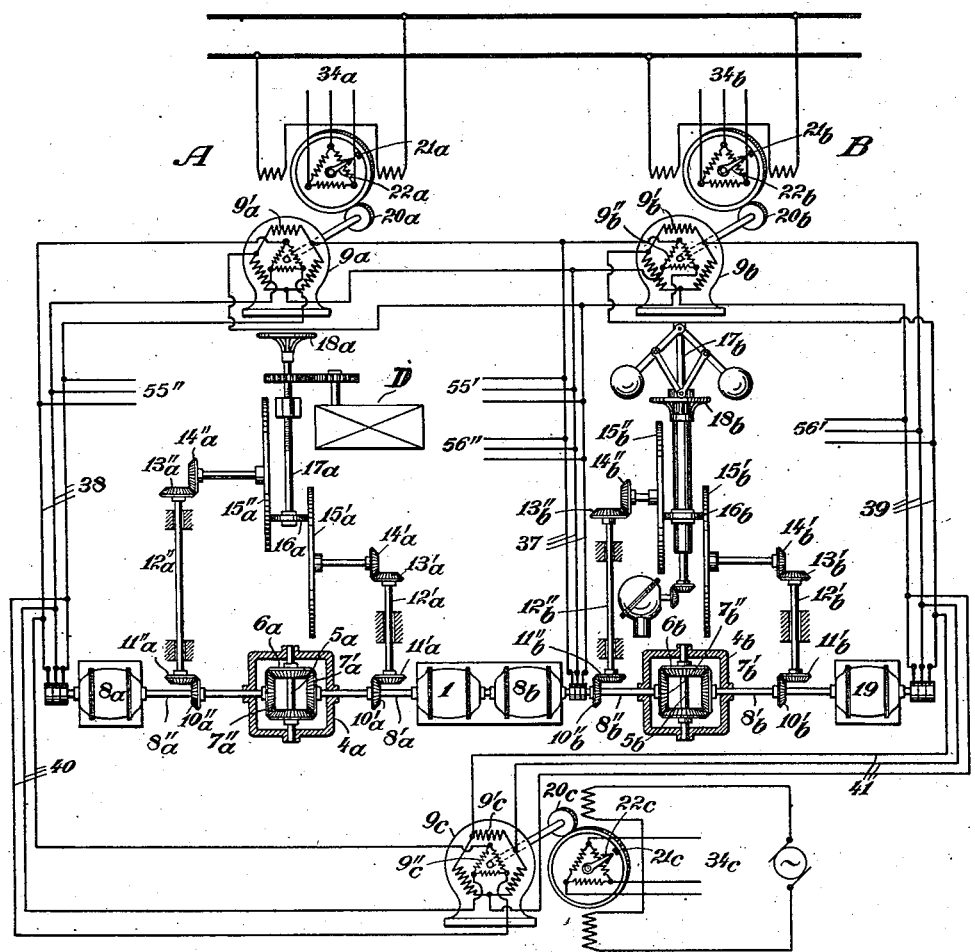
*Fig. 8.ª*
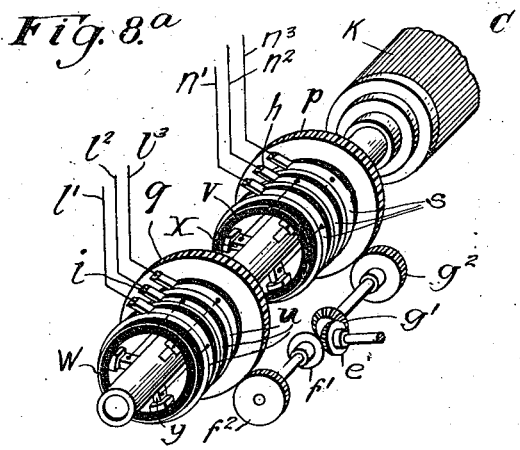
INVENTOR
JOHANN W. G. ILLAUER,
By Lotka, Kehlenbeck & Farley
ATTORNEYS Patented Oct. 2, 1928.

1,686,327

UNITED STATES PATENT OFFICE.

JOHANN WILHELM GEORG ILLAUER, OF BERLIN-CHARLOTTENBURG, GERMANY, AS-
SIGNOR TO GESELLSCHAFT FUER ELEKTRISCHE APPARATE MIT BESCHRAENKTER
HAFTUNG, OF BERLIN-MARIENFELDE, GERMANY, A CORPORATION OF GERMANY.

SYSTEM FOR THE TELECONTROL OF OBJECTS.

Application filed June 26, 1924, Serial No. 722,464, and in Germany June 28, 1923.

My invention relates to improvements in systems for the remote control or telecontrol of objects, such as guns, search-lights, telescopes, pointers and the like, by controlling the motors which adjust the objects. The improved system is particularly useful for the control from a distance of objects which are mounted on oscillating platforms, for instance the decks of ships.

The object of my invention is to attain the adjustability of any desired speed of the driving motor of the object with small energy consumption and with the elimination of non-productive movements at the individual adjusting stations. This end in view is attained by the drive of the objects to be adjusted being effected by the difference of the speeds of two rotating fields in the driving motor. This difference is preferably attained, for instance, by the regulation of the speeds of two generators operated from the same source of energy by means of a planetary gear. This arrangement may be simplified by providing instead of the two generators two rotatable sets of brushes on a single generator for producing the rotating fields, which brushes are simultaneously moved in opposite directions by a suitable gear. A single generator with a fixed set of brushes and an auxiliary apparatus with a rotatable set of brushes and fed by said generator may equally well be employed for the same purpose.

The regulation of the speed of the rotating fields takes place in all cases at the control stations, preferably by a device for instance, by a friction wheel gearing which has no steps so that a jerky change of the adjusting motion is avoided. For controlling the operation of this stepless regulation device, and in order to avoid inaccuracies owing to slip and the like, auxiliary checking or supervising means, for instance pointers, telescopes and the like may, according to this invention be provided, which auxiliary means are operated from similar driving devices as the objects to be adjusted.

The regulation of the speed of the rotating fields can take place either by hand or by automatically operating means, for instance well known stabilizing devices, such as gyroscopes.

My invention is also applicable to installations in which it is desired to make certain objects perform certain individual movements by the telecontrol of their driving motors and simultaneously to move other objects located at a distance in correspondence with the sum of the said individual movements.

Further details of the invention will be more fully explained with reference to the drawings affixed to this specification and forming part thereof.

In the drawings:—

Fig. 1 is a partially diagrammatic, plan, view of an apparatus, embodying the principles of my invention for the regulation of a driving motor for an object to be controlled from a distance.

Fig. 2 is a side elevation showing, by way of example, the manner in which the driving motor, of the apparatus shown in Fig. 1, controls a gun.

Figs. 3, 4 and 5 illustrate auxiliary devices for checking, or supervising, the operation of the constructions shown in Figs. 1 or 7.

Fig. 6 shows an automatic auxiliary device for regulating the arrangement.

Figure 8:
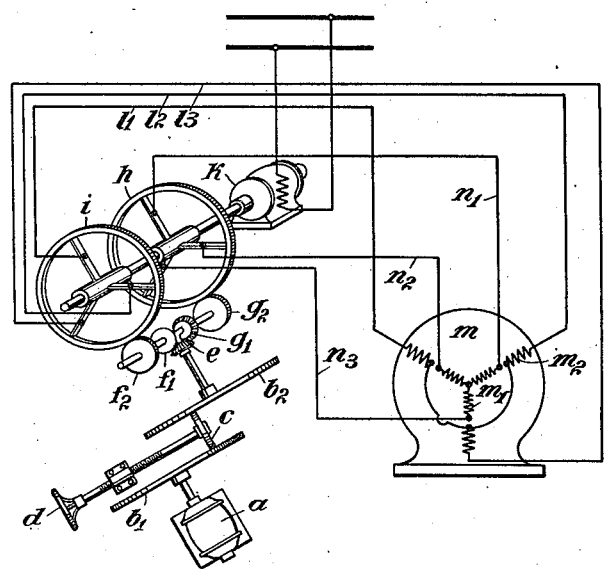
Figure 9:
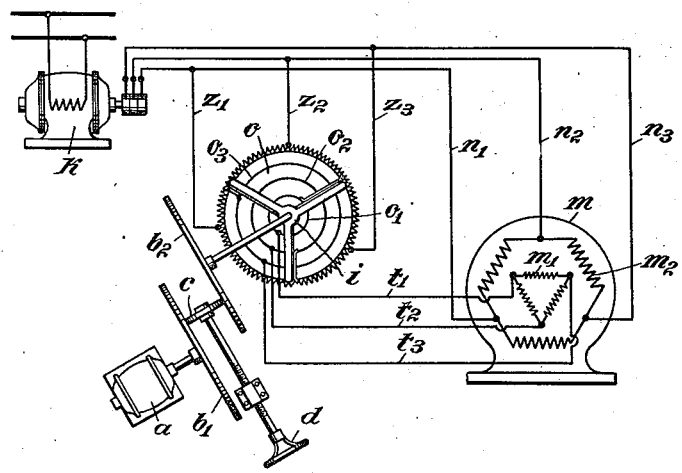

Fig. 7 is a view similar to Fig. 1 of an arrangement which enables two objects to carry out different individual movements and simultaneously to move a third object in correspondence with the sum of these individual movements and, Figs. 8 and 9 are views similar to Fig. 1 showing simplified arrangements for the production of rotating fields; and Fig. 8ª is an enlarged perspective detail view of the rotating brushes for the regulating generator $k$ of Fig. 8.

Similar parts are indicated by similar letters of reference throughout all the figures of the drawings.

Referring to Fig. 1, it will be seen that a machine 1 rotating at a uniform speed, for instance a gas engine, an electromotor or the like, drives by means of bevel wheels 2 and 3, the casing 4 of a differential gear. The shafts 5, 5 of the planet wheels 6, 6 journaled in this casing 4 take part in the rotation of the casing and drive the bevel wheels 7, 7 of the two generators 8', 8''. The generator 8' is connected with the stator 9' of a differential motor 9, by conductors 25' while the generator 8'' feeds, by conductors 25'', the rotor winding 9″ of the differential motor 9. The exciter windings 23′ and 23″ of the generators 8′ and 8″ are fed from the supply system. If the generators 8′, 8″ are not affected by any disturbances they will rotate at equal speeds, the magnetic rotating fields produced by them in the differential motor 9 will be equal and the motion of the rotor 9″ is zero. If, however, the fields of the motor are made unequal as for example by changing the relative speeds of the two generators by the regulating device presently to be described, then the rotor 9″ of the motor 9 will take part in the rotation in correspondence with the difference of the speeds of the two generators and the rotating fields generated by them. The worm 27 arranged upon the rotor shaft 26 will then also be rotated and drives the object to be adjusted in a manner not illustrated.

A suitable regulation of the speed of the generators is effected by the following mechanism. Upon the shaft 30′ (30″) of the generator 8′ (8″) is keyed a bevel wheel 10′ (10″) which drives by a bevel wheel 11′ (11″) a shaft 12′ (12″), bevel wheels 13′ (13″) and 14′ (14″) the friction discs 15′ (15″).

Between these friction discs rotates a friction roller 16, which is adapted to be moved axially by means of a screwthreaded shaft 17 and a hand-wheel 18. When the friction roller 16 is in the central position in which the effective radii of both friction discs 15′ and 15″ are equal the speeds of both generators are also equal. If, however, the friction roller 16 is displaced by means of the hand-wheel 18 that generator connected with the friction disc whose effective radius is the shorter will run faster while the other generator will run slower. The differential motor 9 thus rotates in one or the other direction in accordance with the adjustment of the friction roller 16, and at a speed which is proportional to the displacement of said roller.

If it is desired to transmit the same amount of motion to a plurality of objects a corresponding number of other differential motors are connected in parallel by connecting wires 55′ and 55″ with the differential motor 9 (Fig. 1) or 9ᵇ (Fig. 7).

Fig. 2 illustrates an example of the manner of controlling a gun from the differential motor 9. Upon the shaft of the rotor is fixed a worm 27 which gears with a segment 28 fixed upon the gun 29. The angle of elevation of the gun 29 is thus adjusted by means of the worm 27 and the toothed segment 28.

Fig. 3 illustrates an auxiliary device for supervising the operation of the constructions shown in Figs. 1 or 7. A differential motor 30 of small size is connected in parallel with the differential motor 9 or 9ᵃ by means of the wires 55′ and 55″. The worm 31 mounted on its shaft consequently turns the worm wheel 36, which gears with the worm, with the same speed with which the shaft 26 of the differential motor 9 rotates. Upon the wheel 36 is fixed a counter-pointer or mark 35. Above the wheel 36 designed as receiver of a transmission system travels a main pointer 32 which is remotely controlled by a transmitter, not illustrated, by means of the conductors 33. The pointer 32 is moved by the same amount which is to be adjusted by the motor 9. If the pointers 32 and 35 do not coincide the hand-wheel 18 (Fig. 1) must be turned until this is the case.

In the case where it is desired to check or supervise the adjustment or control of an object mounted on an oscillating platform so as to compensate for the oscillations of the platform, the auxiliary checking device shown in Fig. 4 is preferably employed. It will be understood that this checking device may be used with either of the arrangements shown in Fig. 1 or Fig. 7. As shown in Fig. 4 a spur gear 46 is secured to the shaft 17 upon which the hand wheel 18 and friction roller 16 are mounted. This gear meshes with a co-operating spur gear 47 secured upon one end of a shaft 48, which is for part of its length, provided with a screw thread. A second friction roller 49 is rotatably mounted upon a nut which has its bore screw threaded for engagement with the screw threads of the shaft 48, and said roller 49 is in engagement with a cylinder 52 secured to the armature shaft of a constant speed motor 50. The motor 50 is energized from a suitable source of current and serves, through the action of the cylinder 52, to drive the friction roller 49. The friction roller 49 is also in engagement with a friction disc 51 and serves to rotate the latter. A telescope 45, mounted on a support which oscillates in unison with the oscillating platform, is operatively connected with the friction disc 51 by means of the worm segment 44 secured to the fulcrum of the telescope, a worm 43 in mesh with said segment and the bevel gears 53 and 54. With this device it will be obvious that as the hand wheel 18 is turned to adjust the roller 16, the roller 49 will be displaced by an amount corresponding to the displacement of the roller 16 and therefore the telescope will partake of the same movements as the object being controlled. The motor 50, as heretofore pointed out, rotates at a constant speed and by means of the friction wheels 52, 49 and 51 drives the bevel gears 53, 54, thus moving the telescope 45 which serves as a checking or supervising device, so that observations made by means of the telescope can be used for checking against the proper operation of the object mounted on the oscillating platform. Adjustment of the hand wheel 18 serves through the gears 46, 47, to effect the adjustment of the friction roll 49 as well as the friction roll 16; adjustment of the roll 16 serving to regulate the operation of the main driven member, for example, the gun 29, while adjustment of the roll 49 insures a similar operation of the checking or supervising telescope. It will be remembered that the friction roll 16 is caused to be rotated by the rotation, or rather differences in the speed of rotation, of the friction discs 15', 15'', and that as the friction roll 49 merely acts as an idler, the friction roll 52 and motor 50, or any other device which rotates at a constant speed, is needed to produce the rotation of the idler friction roll 49 and the friction disc 51. A modified construction of a device similar to the one shown in Fig. 4 is illustrated in Fig. 5 and consists in the provision of a differential motor 42, secured by the worm wheel 43, and worm segment 44, to the telescope 45, upon the fulcrum of which the segment 44 is secured in the same manner as shown in Fig. 4. The motor 42 is connected in parallel with both the stator and rotor of the motor 9 (Fig. 1) by the conductors 56' and 56''. With this arrangement it will be seen that the differential motor 42 will move in unison with the motor 9 so that the movement of the telescope and the object to be controlled, for example, the gun 29, will be the same. The construction shown in Fig. 5 is particularly applicable where it is desired to have an observer, located at a distance from the operator of the hand wheel 18, check or supervise the adjustment of the object to be controlled. For example, if the gun 29 mounted on the deck of a ship is to be controlled, the telescope may be located in an observation mast or any other part of the ship, while the control handle 18 may be located in the gun turret, below decks, or wherever desired. It will be obvious that while the structures shown in Figs. 4 and 5 may be used alternatively, that is to say, substituted one for the other, they may also be used together in combination, the structure of Fig. 4 being used at the control station while the structure of Fig. 5 is used at an observation post.

Instead of the hand adjustment of the friction roller 16 shown in Fig. 4, an automatically operating adjustment may, if desired, be provided. Fig. 6 shows by way of example a mechanical automatically operating regulation for the friction roller 16, which may be substituted for the manually controlled handle 18 of Fig. 1 for compensating for oscillations of the platform upon which the object to be controlled is mounted. With this modification I may employ any of the known stabilizing devices, for instance a gyroscope 68, which transmits its motion by means of bevel wheels 69, 70 to a shaft 72 upon which a centrifugal governor 71 is mounted. Upon the sleeve 73 of the governor which moves axially when the shaft 70 72 is rotated, the friction roller 16 (Fig. 1) is fixed and if now, as assumed, the shaft 72 is rotated from the gyroscope 68 in correspondence with the rolling motion of the ship, the friction roller 16 will, if the regulating gear is properly designed, be displaced axially by such a distance, that it automatically adjusts the operative radii of the friction discs 15', 15'' in the same manner, as would have been done in the system according to Fig. 1 by turning the handwheel 18.

If it is desired to transmit a plurality of adjustments to the same object, this may be effected by multiplying the arrangement shown in Fig. 1. Preferably the simplified arrangement illustrated in Fig. 7 should, however, be employed in such a case. In this figure it has been assumed, by way of example, that certain adjustments should simultaneously be transmitted to two places A and B, which adjustments may differ from each other, and to a third place C the sum of these two single adjustments. The devices for controlling the operations fully explained in the Figures 3-6 are also diagrammatically illustrated in this Figure 7. A motor 1 of constant speed directly drives a generator $8^b$ mounted on its shaft $8'^a$. This generator feeds by the lines 37 the stator winding $9'^a$ of a differential motor $9^a$ at the place A and simultaneously the rotor winding $9''^b$ of a differential motor $9^b$ at the place B. The rotor winding of the motor $9^a$ is connected by a conductor 38 with a second generator $8^a$ and the stator winding $9'^b$ of the motor $9^b$ by conductors 39 with a third generator 19. The generator $8^a$ furthermore feeds the rotor winding $9''^c$ of a differential motor $9^c$ at the place C by means of the wires 40. The stator winding of this motor $9^c$ is connected by conductors 41 with the generator 19.

The motor 1 drives the generator $8^a$ by means of a shaft $8'^a$ and differential gearing $4^a$, $5^a$, $6^a$, $7'^a$, $7''^a$ and the generator 19 by means of shaft $8''^b$ and differential gear $4^b$, $5^b$, $6^b$, $7'^b$, $7''^b$. From the shafts $8'^a$ and $8''^a$ branches off the regulation gear. A bevel wheel $10'^a$ keyed to the shaft $8'^a$ gears with the bevel wheel $11'^a$ which by means of the shaft $12'^a$ drives a bevel wheel $13'^a$. The bevel wheel $13'^a$ turns the driving wheel $14'^a$ of a friction disc $15'^a$, which is coupled with a friction disc $15''^a$ by means of a friction roller $16^a$. The friction roller $16^a$ can be adjusted by means of a hand-wheel $18^a$ and spindle $17^a$. The disc $15''^a$ drives by means of bevel wheels $14''^a$, $13''^a$ the shaft $12''^a$ which transmits its motion by means of the bevel wheel 11″ᵃ to the bevel wheel 10″ᵃ keyed upon the generator shaft 8′ᵃ. For the generator 19 a regulating device is provided which is connected with a bevel wheel 10″ᵇ keyed upon the shaft 8″ᵇ and a bevel wheel keyed upon the shaft 8′ᵇ. The gearing consisting of 10″ᵇ, 11″ᵇ, 12″ᵇ, 13″ᵇ, 14″ᵇ, 15″ᵇ, 16ᵇ, 17ᵇ, 18ᵇ, 15′ᵇ, 14′ᵇ, 13′ᵇ, 12′ᵇ, 11′ᵇ, 10′ᵇ corresponds exactly with the one for regulating the generator 8ᵃ, which has been described before. The differential gears 4ᵃ, 5ᵃ, 6ᵃ, 7′ᵃ, 7″ᵇ and 4ᵇ, 5ᵇ, 6ᵇ, 7′ᵇ, 7″ᵇ, which are exactly similar consist of bevel wheels 7′ᵃ (7′ᵇ) and 7″ᵃ (7″ᵇ), which are keyed upon the shafts 8′ᵃ (8′ᵇ) and 8″ᵃ (8″ᵇ) and a casing 4ᵃ (4ᵇ) rigidly connected with the same shafts. In the casing a shaft 5ᵃ (5ᵇ) is journaled which carries two bevel wheels 6ᵃ (6ᵇ) gearing with the bevel wheels 7′ᵃ (7′ᵇ) and 7″ᵃ (7″ᵇ). At each of the places A, B, C a differential motor 9ᵃ, 9ᵇ, 9ᶜ, is mounted, which by means of a gearing 20ᵃ, 20ᵇ, 20ᶜ adjusts the counter pointers 21ᵃ, 21ᵇ, 21ᶜ. The corresponding main pointers 22ᵃ, 22ᵇ, 22ᶜ are rotated in known and therefore not illustrated manner by means of the conductors 34ᵃ, 34ᵇ, 34ᶜ. By means of the handwheel 18ᵃ the three-phase generator 8ᵃ is so regulated, that the counter pointer 21ᵃ driven by the motor 9ᵃ remains in register with the main pointer 22ᵃ and by means of the handwheel 18ᵇ the three-phase generator 19 is so regulated that the counter pointer 21ᵇ rotated by the motor 9ᵇ remains in register with the main pointer 22ᵇ. The differential motor 9ᶜ connected with the three-phase generators 8ᵃ and 19 then turns the counter pointer 21ᶜ in correspondence with the sum of the movements of the counter pointers 21ᵃ and 21ᵇ. If, on the other hand, it is only necessary to telecontrol a remote object according to the sum or difference of a plurality of individual movements, the system shown in Fig. 7 may be considerably simplified. In such a case the system of Fig. 1 suffices. The friction roller 16 of Fig. 1 is then adjusted by means of the hand wheel 18 by such an amount that the object to be controlled is moved by the motor 9, at an amount corresponding to the predetermined sum or difference of the plurality of individual movements.

In some cases it will be desirable to provide means for the adjustment of the friction roll 16ᵃ from a distant station. In such cases any well known automatic device, such as the motor or the receiver of a distant control transmission system, may be geared to the shaft 17ᵃ so as to be used alternatively for adjusting said roll in place of the hand wheel 18ᵃ, such a device is indicated diagrammatically at D in Fig. 7 of the drawings.

In order to further simplify the mechanism according to this invention an arrangement may be employed as illustrated in Fig. 8 or Fig. 9. Instead of employing a generator for the generation of each rotating field as in Fig. 1, and thus two altogether different generators for the remote control of the driving motor of the object to be adjusted, the system according to Fig. 8 enables a single generator to suffice for all cases. A source of power $a$ (a motor, clock-work or the like) rotates with constant speed a friction disc $b^1$ which by means of a friction roller $c$, adjustable by means of a hand-wheel $d$, rotates a friction disc $b^2$.

The enlarged perspective detail of Fig. 8ᵃ shows more clearly the construction of the parts by which the single generator is connected to the friction wheel $b^2$ and the parts by which the speed of the differential motor is controlled. As shown in Fig. 8ᵃ the armature shaft of the differential motor is constructed of a plurality of laminated, alternately arranged, conductors and non-conductors, each conductor being in circuit with an armature coil. Arranged concentrically of the armature shaft is a pair of sleeves $v$, $w$, of insulating material which sleeves have secured to the exterior thereof a plurality of contact rings $s$, $u$, respectively, with which the exterior brushes $h$, $i$, engage. Secured to the interior of the sleeves $v$, $w$ are the inner brushes $x$, $y$, which engage the laminated armature shaft, each brush $x$, or $y$, being connected by a connecting wire with its respective ring $s$, or $u$. The sleeves $v$, $w$, are provided with spur gears $p$, $q$, respectively, with which mesh the spur gears $g^2$, $f^2$, mounted, respectively, on the shafts which carry the bevel gears $g^1$, $f^1$, and the latter meshing with the bevel gear $e$ secured to the shaft upon which the friction wheel $b^2$ is secured.

The motion of the friction disc $b^2$ is transmitted by means of gear wheels $e$, $f^1$, $f^2$ to the movable set of brushes $y$ of the generator $k$ and by the gears $e$, $g^1$, $g^2$ simultaneously to the second set of movable brushes $x$, upon the same generator. Both sets of brushes $x$, $y$ are adapted to be turned in opposite directions. The stator $m^2$ of a differential motor $m$ is connected by the wires 11, 12 and 13 with the brushes of the set $i$. The set of brushes $h$ feeds the rotor winding $m^1$ of the same differential motor by means of the wires $n^1$, $n^2$ and $n^3$. The motor is in this figure shown in star connection in constradistinction to the delta connection for the motor in the hitherto shown figures. It will be obvious that it is a matter of indifference which of the two mentioned systems of connection is employed. Instead of the delta and the star connection any other polygon connection may be employed.

If in Fig. 8ᵃ the sets of brushes $x$ and $y$ are at rest, which can be attained by the adjustment of the friction roller $c$, the motor $m$ also stands still.

When the relative position of the sets of brushes is changed by an axial displacement of the friction roller $c$ by means of the hand-wheel $d$ the motor $m$ starts rotating in correspondence with the movement of the sets of brushes, which for instance by the mechanism shown in Fig. 2, can be transmitted to any object which is to be adjusted.

If it is desired to avoid the provision of two movable sets of brushes on one generator, the construction illustrated in Fig. 9 may be employed. Here a motor $a$ drives by means of a regulable friction drive $b^1$, $c$, $d$, $b^2$ directly the set of brushes $i$ which is arranged in an auxiliary device $o$ constructed in the manner of a direct current dynamo and which is fed from the generator $k$ by conductors $z^1$, $z^2$, and $z^3$. The set of brushes again consists of brushes displaced in relation to each other by an angle of 120° which glide over contact rings $o^1$, $o^2$, $o^3$, of the auxiliary device. This auxiliary device is connected with the rotor $m^1$ of the differential motor $m$ by conductors $t^1$, $t^2$ and $t^3$. The stator winding $m^2$ of the motor $m$ is fed from the generator $k$ by means of conductors $n^1$, $n^2$ and $n^3$. When the brushes $i$ are at rest the motor $m$ also stands still since its stator and rotor winding are fed by current of equal frequency. If, on the other hand on turning the set of brushes in consequence of the displacement of the friction roller $c$ by means of the hand-wheel $d$, the speed of the rotor field is changed in relation to the stator field in one or the other sense, the motor rotates in correspondence with the difference of the speeds of the two rotating fields.

The control or supervising devices illustrated in the Figures 3, 4 and 5 may obviously equally well be employed in arrangements according to the Figures 7, 8 and 9. This also holds good for the automatic regulating device for the friction drive illustrated in Fig. 6.

It will be readily understood, that instead of the auxiliary supervising mechanism, such as the telescopes 45, illustrated in Figs. 4 and 5 of the drawings any other similar mechanism may be employed, and likewise instead of the mechanical automatic regulating devices 68 and 71 for the friction roller 16 shown in Fig. 6, any other suitable but differently constructed electrical or electro-mechanical regulating device, may be used without departing from the spirit of my invention.

I wish it to be understood that I do not limit myself to the details of the mechanisms illustrated by way of example and that these may obviously be modified by those skilled in the art without departing from the spirit of my invention or sacrificing any of its advantages.

What I claim as my invention and desire to secure by Letters Patent is:—

1. In a system for the telecontrol of objects, in combination, two sources of alternating currents having movable elements, a single power machine in the total system, said machine being of constant speed for driving the movable elements of said sources, a stepless device for regulating the relative speed of said movable elements, the speed of movement of said movable elements determining the frequency of the current from each of said two sources, and a motor for adjusting the object to be controlled, the rotor of said motor being supplied with current from one of said sources, and the stator of said motor being supplied with current from the other of said sources.

2. In a system for the telecontrol of objects, in combination, two sources of alternating currents having movable elements, a single power machine in the total system, said machine being of constant speed for driving the movable elements of said sources, a friction wheel gearing for regulating the relative speed of said movable elements, the speed of movement of said movable elements determining the frequency of the current from each of said two sources, and a motor for adjusting the object to be controlled, the rotor of said motor being supplied with current from one of said sources, and the stator of said motor being supplied with current from the other of said sources.

3. In a system for the telecontrol of objects, in combination, two generators of alternating currents, a machine of constant speed, a differential gear inserted between the shafts of said two generators respectively, said differential gear being actuated by said machine, an adjustable device connected to the shafts of said two generators respectively and adapted to transmit part of the energy of rotation from the shaft of one of said generators to the shaft of the other and vice versa, and a motor for adjusting the object to be controlled, the rotor of said motor being supplied with current from one of said two generators, and the stator of said motor being supplied with current from the other of said two generators.

4. In a system for the telecontrol of objects, in combination, two sources of alternating currents having movable elements, a single machine of constant speed, a common driving gear inserted between said machine and the movable elements of said two sources respectively, means for regulating the frequencies of the currents from each source in relation to the frequency of the current from the other source, a gyroscopic device connected to said regulating means and adapted to adjust automatically said means, and a motor for adjusting the object to be controlled, the rotor of said motor supplied with current from one of said sources, and the stator of said motor supplied with current from the other of said sources.

5. In a system for the telecontrol of objects, a first source of alternating current, a second source of alternating current, means for regulating the relative frequencies of the currents from said sources, a motor for adjusting an object to be controlled, the rotor of said motor supplied with current from said first source and the stator of said motor supplied with current from said second source, a third source of alternating current, other means for regulating the frequencies of the current of said third source in relation to the frequency of the current of said second source, a second motor for adjusting another object to be controlled, the rotor of said second motor being supplied with current from said second source, and the stator of said second motor being supplied with current from said third source, and a third motor for adjusting an object to be controlled in correspondence with the sum of the adjustments of the two first-named objects, the rotor of said third motor being supplied with current from said first source, and the stator of said third motor being supplied with current from said third source.

6. In a system for the telecontrol of objects, in combination, a first source of alternating current, a second source of alternating current, means for regulating the relative frequencies of the currents from said sources, a motor for adjusting an object to be controlled, the rotor of said motor being supplied with current from said first source, and the stator of said motor being supplied with current from said second source, a third source of alternating current, other means for regulating the frequencies of the current of said third source in relation to the frequency of the current of said second source, a second motor for adjusting another object to be controlled, the rotor of said second motor being supplied with current from said second source, and the stator of said second motor being supplied with current from said third source, a third motor for adjusting an object to be controlled in correspondence with the sum of the adjustments of the two first named objects, the rotor of said third motor being supplied with current from said first source, and the stator of said third motor being supplied with current from said third source, all said sources having movable elements, and a single machine of constant speed for driving the movable elements of said sources.

7. In a system for the telecontrol of objects, in combination, a first generator of alternating current, a second generator of alternating current, a third generator of alternating current, a machine of constant speed, the shaft of said machine and that of said first generator being coupled together, a differential gear inserted between the shaft of said machine and that of said second generator, a second differential gear inserted between the shaft of said machine and that of said third generator, said machine adapted to drive simultaneously the movable parts of said generators, means for regulating the frequency of the currents from said first generator in relation to that from said second generator, other means of the same type as the first named means for regulating the frequency of the currents from said first generator in relation to that from said third generator, a first motor for adjusting an object to be controlled, the rotor of said motor being supplied with current from said second generator, and the stator of said motor being supplied with current from said first generator, a second motor for adjusting another object to be controlled, the rotor of said second motor being supplied with current from said first generator, and the stator of said second motor being supplied with current from said third generator, a third motor, the rotor of said third motor being supplied with current from said third generator.

In testimony whereof I affix my signature.

JOHANN WILHELM GEORG ILLAUER.